E. J. BROOKS.
CHAIN ATTACHMENT.
APPLICATION FILED OCT. 23, 1916.

1,256,105.

Patented Feb. 12, 1918.

E. J. Brooks
Inventor

UNITED STATES PATENT OFFICE.

ELBERT J. BROOKS, OF SPARTA, WISCONSIN.

CHAIN ATTACHMENT.

1,256,105.      Specification of Letters Patent.      Patented Feb. 12, 1918.

Application filed October 23, 1916. Serial No. 127,175.

*To all whom it may concern:*

Be it known that I, ELBERT J. BROOKS, a citizen of the United States, residing at Sparta, in the county of Monroe and State of Wisconsin, have invented new and useful Improvements in Chain Attachments, of which the following is a specification.

This invention relates to chain attachments designed for detachably connecting the ends thereof, and its object is to provide a novel and improved device of this kind in the form of a hook which is so shaped and attached to the chain that it securely couples the ends thereof and eliminates all danger of the chain ends getting separated.

The invention also has for its object to provide a hook for the purpose stated which can be easily and quickly operated to connect or disconnect the chain ends.

The device is specially applicable to anti-skid chains used in connection with motor vehicle wheels, although it may, with equal facility, be used in connection with other types of chains for connecting the ends thereof.

Figure 1:
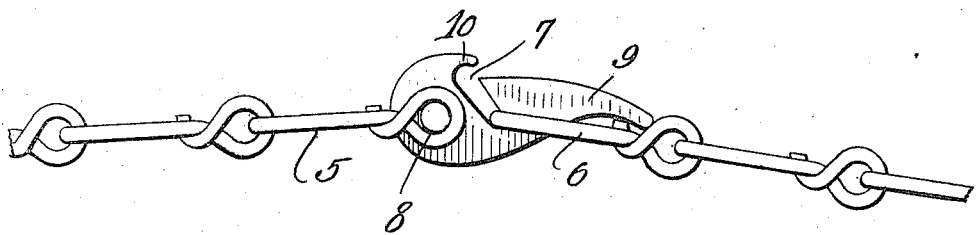
Figure 2:
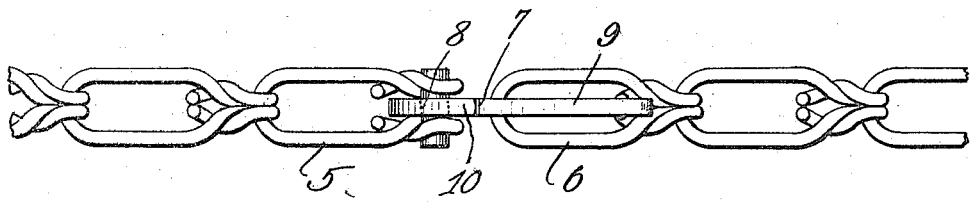

In order that the invention may be better understood, reference is had to the accompanying drawing forming a part of this specification, in which drawing, Figure 1 is a side elevation showing the application of the invention, and Fig. 2 is a plan view thereof.

Referring specifically to the drawing, 5 and 6, respectively, denote the links at the ends of a chain. The hook which is the subject matter of the present application for patent is carried by one of the end links and is detachably connected to the other end link. The drawing shows the detachable connection with the link 6. The hook is a flat piece of metal having in one of its side edges an inwardly directed notch 7 extending obliquely to the longitudinal axis of the hook body. One end of the body is rounded and provided with a perforation or eye 8 for attachment to the link 5, the attachment being a loose one so that the hook may be readily swung into and out of coupling position. The other end of the hook body is elongated and shaped to form an extension or tail 9. This end of the hook also forms the bill thereof, the same being defined by the notch 7, and the part 9 extending rearward therefrom. The eye 8, the inner end of the notch 7 and the edge of the tail 9 on one side thereof are all in substantially longitudinal alinement. Thus, when the bill of the hook is engaged with the link 6 by inserting the latter into the notch 7, and the chain is tightened up, the two links 5 and 6 are in longitudinal alinement, and the tail 9 of the hook is above the link 6, and the extremity of the part 9 engages the end of said link where it connects with the next link of the chain. The tension of the chain has a tendency to swing the tail end of the hook inward toward the link 6 by reason of the relative position of the eye 8 and the inner end of the notch 7, and said part of the hook is therefore held down against the link 6 and the hook cannot accidentally swing back to release the link; nor can the link 6 jump out of the notch 7, as it lies under the part 9. The chain ends are therefore securely connected and they cannot be disconnected until the chain is slacked sufficiently to take the link 6 out of the notch 7.

The notch 7 is inclined in the direction of the tail end 9 of the hook, and at the outer end of the notch, on the same side as the eye 8, is a guard finger 10 which is curved to overhang said end of the notch and provide an additional safeguard against accidental disengagement of the link 6 or unhooking of the chain.

I claim:—

The combination with the end links of a chain; of a connecting member between said links, said member being attached at one end to one of the links, and having intermediate its ends an inwardly directed notch extending obliquely to the longitudinal axis of the member, in which notch the other link detachably seats, the member also having a rearward longitudinal extension at the end opposite the one to which the first mentioned link is attached, said extension being located alongside the second mentioned link when it is seated in the notch, the inner end of the notch, the point of attachment of the connector to the first mentioned link, and the rearward extension being in substantially longitudinal alinement.

In testimony whereof I affix my signature.

ELBERT J. BROOKS.

Copies of this patent may be obtained for five cents each, by addressing the "Commissioner of Patents, Washington, D. C."